July 9, 1940.  R. M. DILWORTH  2,207,373
GENERATOR ENGINE LOAD CONTROL SYSTEM
Filed Sept. 21, 1939
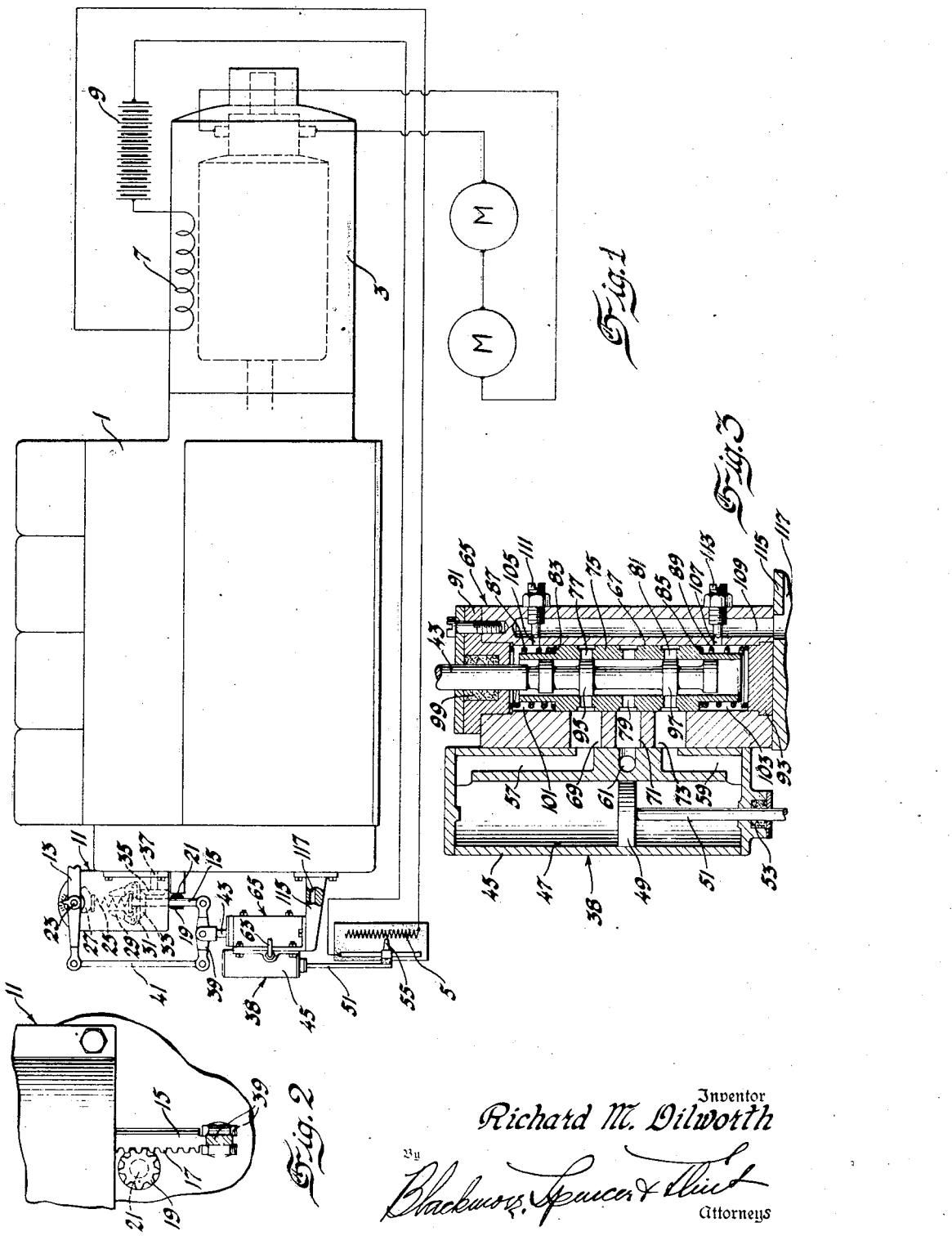
Inventor
Richard M. Dilworth
By
Blackmore, Spencer & Flint
Attorneys Patented July 9, 1940

2,207,373

UNITED STATES PATENT OFFICE 2,207,373

GENERATOR ENGINE LOAD CONTROL SYSTEM

Richard M. Dilworth, La Grange, Ill., assignor to General Motors Corporation, Detroit, Mich., a corporation of Delaware Application September 21, 1939, Serial No. 295,858

9 Claims. (Cl. 290—17)

This invention relates to power generating systems, and more particularly to the control of such systems in which a prime mover is arranged to drive an electric generator supplying current to an external electrical load.

The invention is particularly adapted to the control of vehicles such as locomotives or the like in which internal combustion engines, usually of the Diesel type, are arranged to drive electric generators supplying power to traction motors. The variation in the demand for power from the power generating system on vehicles of this type, due to sudden and great changes in load on the traction motors, requires a control system which will prevent overloading and underloading of the prime mover in order to obtain maximum operating efficiency therefrom. In order to accomplish this result, it is necessary to provide control means whereby the external load on the prime mover is automatically adjusted to equal the output at any selected load and speed.

This invention provides control means for varying the external load on the engine by varying the excitation of the generator, the movement of the excitation varying means being controlled by the combined movement of a controller and a speed and load sensitive device. The controller is arranged so that the speed and load sensitive device may be adjusted to any one of a plurality of settings so that it will regulate the amount of fuel supplied to the prime mover to cause it to operate at constant speed and torque at the selected controller position and simultaneously regulate the external load on the engine by varying the generator excitation. The power generating system can therefore be operated at constant output at any one of a number of selected speeds with corresponding values of torque for each speed, the speed and load sensitive device acting to maintain the demand for power on the power generating system equal to its available power output.

In addition to the above features, the control also provides means for matching the engine operating characteristics to the generator characteristics so that the response of both, due to the adjustment in amount of fuel and excitation at corresponding rates, determined by movement of the governor, establishes a balance between the external load and output. This means is regulatable so that the characteristics of the power generative system may be adjusted to conform to different rates of change in the external load and the over-all operating characteristics desired. By this means for example the power generating system characteristics may be adjusted for use on different types of vehicles such as a shunting locomotive, freight or passenger locomotive or on a city or inter-city bus and the adjustments may be made to suit the locality in which the particular vehicle is operated.

The principal object of the present invention is to provide a control which may be set to maintain substantially constant speed, torque and/or output of a power generating system at each of a plurality of settings by automatically regulating the amount of motive fluid supplied to a prime mover and the external load thereon by simultaneously regulating the excitation of the generator, the rate of movement of the excitation regulator being regulatable with respect to the rate of movement of the motive fluid regulator to properly restore a balance between the demand for power and the available output of the system for variations in speed due to changes in the external load.

In order that the invention may be clearly understood, reference will now be made to the following description and illustrated by the attached drawing, in which:

Figure 1 is a diagrammatic representation of a power generating system embodying the invention;

Figure 2 is an enlarged view showing a connection between two of the control elements of Figure 1; and Figure 3 is an enlarged cross sectional view of regulatable connecting means between two other control elements shown in Figure 1.

Referring to the drawing, Figure 1 illustrates a power generating system including a prime mover 1 which is shown as an internal combustion engine of the Diesel type, though any other type of prime mover may be used. A generator 3 is suitably connected to be driven by the prime mover. Means for varying the generator output is shown as an adjustable rheostat 5 arranged to vary the excitation current through a field winding 7 supplied from a battery source 9. The excitation current may be supplied from the generator itself which may have a plurality of field exciting windings, not shown, in addition to the winding 7. The prime mover 1 and generator 3 are controlled by a speed responsive governor indicated generally at 11 driven by the prime mover 1. The governor may be adjusted by means of a control lever 13 associated with the governor mechanism to cause the system to operate at any speed at constant output. The power output of the generator is supplied to an external load such as the traction motors shown at M, usually of the series type.

Any type of speed responsive governor may be used which may be either directly connected to move a rod 15 proportional to variations in speed or may move to control a power servo, not shown, arranged to move the rod 15 in a well known manner. As shown in Figure 2, the rod 15 has a rack portion 17 meshing with a pinion 19 integral with a shaft 21 which constitutes part of a fuel regulating device for the engine. The shaft 21 when rotating regulates the amount of fuel supplied to the engine and may also vary the injection timing to vary the speed and torque thereof. Linear movement of the rod 15 causes the shaft 21 to be rotated so that the amount of fuel supplied to the engine will be increased for a decrease in speed due to an increase in load and, conversely, upon a reduction in load the speed will increase which causes the governor to move the rod 15 to decrease the fuel supply for a given speed setting of the governor. An isochronous governor may be used where precision regulation of the power generating system is necessary, in which case the shaft 15 will be moved by the governor when a slight change in speed occurs so that the fuel will be either increased or decreased an amount necessary to correct for the change by the time the governor reaches its original position, the shaft 15 remaining in the same position to which it was moved until another variation occurs. The fuel adjustments are therefore made in a number of small steps with this type of governor to prevent hunting.

The speed setting of the governor may be varied by the control lever 13 which is fixed to a shaft 23 rotatably supported adjacent a governor spring 25, the upper end of which is in contact with a cam 27 also fixed to the shaft 23. The other end of the spring bears on the upper end of the shaft 15 which is moved directly by centrifugally actuated governor weights 29 operably connected therewith. The weights 29 are pivoted to a member 31 rotated proportional to engine speed by the bevel gears 33 and 35 fixed respectively to the governor-driven member 31 and to an engine-driven shaft 37. When the control lever 13 is moved the shaft 23 and cam 27 will be rotated and vary the load on the governor spring 25 which opposes outward movement of the centrifugally actuated weights 29. The lever may be moved to any one of a plurality of positions manually or may be moved by any actuating mechanism capable of being controlled from a distance by a manually operable controller, not shown, to control one or a plurality of power generating systems, not shown, operating in multiple. By this means any number of operating speeds can be preselected with a value of engine torque corresponding to each of these speeds.

To control the power generating system so that it operates at constant power output, it is necessary to simultaneously vary the external load on the engine by varying the generator output in proportion to the available power output of the system. This is accomplished by a servo mechanism, indicated at 38, controlled by the combined movements of the speed setting control lever 13 and the governor rod 15. The position of the control lever 13 is proportional to the speed setting and the position of the rod 15 is proportional to engine torque, the combination of these two positions therefore being proportional to the power output of the engine.

A floating lever 39 serves to connect the control lever 13 and the governor rod 15. One end of the lever 39 is pivotally attached to the rod 15 and the other is pivotally attached to a link 41 having its opposite end pivotally attached to the control lever 13. To a point substantially midway between the ends of the lever 39 a primary valve member 43 is attached. This primary valve controls the servo 38 and includes means associated with the valve and servo to regulate the rate and extent of movement of the servo so that the rate of change in excitation of the generator and therefore its output is suitable to match the rate of change in external load to prevent overloading or underloading of the prime mover.

The servo mechanism 38 consists of a housing or cylinder 45 having a bore 47 containing a movable piston 49 and cooperating valve mechanism contained in a valve casing 65 having communicating ports and passages between a source of fluid pressure and the bore 47 of the cylinder 45, as shown in detail in Figure 3. The piston 49 constitutes a power operated device.

A piston rod 51 is attached to the piston 49 and extends outward through a stuffing box 53. The rod 51 is provided with a contact 55 fixed to the extremity of the rod 51 and insulated therefrom which serves to vary the resistance of the rheostat 5 and control the excitation current through the field winding 7 supplied from the battery 9. The rod and piston are moved by fluid pressure applied to either the space above or below the piston through either of the passages 57 or 59 in the housing 45. A passage 61 in the housing 45 is connected by means of a pipe 63, shown in Figure 1, to a source of fluid pressure which may be supplied from the engine lubricating pump, not shown. The movement of the piston is controlled by the following valve mechanism contained in the valve casing 65 as best shown in Figure 3.

The valve casing 65 is bolted to the cylinder 45 and has an internal bore 67 communicating with the passages 57, 61 and 59 in the cylinder 45 by the connecting passages 69, 71 and 73 which are opened and closed by the primary valve member 43, previously mentioned, and a secondary valve member or sleeve 75 surrounding the primary valve. The secondary valve member is slidably mounted in the bore 67 and is provided with ports 77, 79 and 81 which remain in register with the connecting passages 69, 71 and 73 in the casing 65 when the secondary valve moves with respect to these passages. The ends of the sleeve 75 are turned to a smaller outside diameter to form annular flange portions 83 and 85 and helical compression springs 87 and 89 are placed between these annular portions and end caps 91 and 93 which close the ends of the bore 67. The springs 87 and 89 tend to urge the sleeve 75 to the central portion of the bore as shown in Figure 3. The primary valve 43 is provided with piston portions 95 and 97 and extends outward through a stuffing box 99 in the cap 91. The piston portions 95 and 97 are shown in Figure 3 closing the ports 77 and 81 in the sleeve 75. The cavities 101 and 103 between the ends of the sleeve 75 and the end caps 91 and 93 are connected by passages 105 and 107 to a common passage 109. The area of the passages 105 and 107 may be varied by needle valves 111 and 113 threaded in suitable openings in the casing 65 and having end portions movable axially into or out of the passages 105 and 107. The servo housing 45 and the valve casing 65 may be bolted as a unit to a bracket 115 fixed to the engine 1. The bracket 115 has a cored passage 117, as shown in Figure 3, which connects the passage 101 in the valve casing to the sump or inlet of the pump, not shown, which supplies fluid pressure to the servo mechanism. Movement of the servo piston 49 and the secondary valve member 75 is controlled by the primary valve 43 and the rate of movement of the servo piston and the secondary valve member may be regulated by the needle valves 111 and 113.

The operation of the control system is as follows: With the various control elements in the position shown in Figures 1 and 3, the prime mover, generator and motors are operating at constant speed, torque and output, as determined by the position of the control lever 13. The engine speed and torque are constant and the power output of the power generating system is equal to the demand imposed by the motors which are assumed to be operating at constant speed and load. If the vehicle encounters a grade the motors M will slow down and their back electromotive force will decrease, causing an increase flow of line current and a reduction in the voltage and speed of the generator and engine due to the increase in external load. The governor weights 29 will move inward and move the rod 15 downward increasing the amount of fuel to the engine which momentarily increases its torque and tends to raise its speed to its former value as determined by the loading of the governor spring 25 as set by the control lever 13. Downward movement of the rod 15 also moves the floating lever 39 clockwise about its connection with respect to the link 41, the position of which is also set by the control lever 13. This moves the primary valve stem 43 downward which causes fluid under pressure to enter space below the servo piston 49 through the passages 61 and 71, port 81, passages 73 and 59, and also allows the fluid above the piston to be discharged through passages 57 and 69, port 77, and up through the central bore of the sleeve 75, passage 105, the area of which is restricted by the needle valve 111, and thence through passages 109 and 117 to the prime mover lubricating sump which is maintained at atmospheric pressure. The servo piston will accordingly start moving upward at a rate determined by the area of the discharge passage 105. The resistance of the rheostat 5 will be increased by the corresponding upward movement of the piston rod 51 and the contact 55. The increase in resistance causes a corresponding decrease in the excitation current through the field winding 7 and a corresponding decrease in the generator output and the external load on the engine. The engine speed will accordingly increase on account of the increase in the amount of fuel supplied thereto and the decrease in the external load thereon until the speed, torque and output of the engine and the external load are brought back into balance. When this balance is reached the governor weights 29 will have moved to their original position and the rod 15 and fuel regulating shaft 21 will have likewise been returned to their former positions by the governor. The servo piston however will have moved to a different position, reducing the generator excitation and output an amount necessary to compensate for the increase in the external load. The movement of the servo piston toward this position is initiated by the downward movement of the primary valve and is stopped at this position by downward follow-up movement of the valve sleeve due to the pressure of the fluid discharged from the space above the servo piston. The needle valve 111 limits the flow of the fluid from the servo through the passage 105. The pressure will therefore rise in the cavity 101 above the valve sleeve 75. This pressure tends to move the sleeve downward from its central position to close the ports 77 and 81 and in so moving the lower spring 89 is therefore compressed. The fluid in the lower cavity 103 flows outward to the sump through the passage 107, the area of which is limited by the needle valve 113. The adjustments therefore of both needle valves control the rate of follow-up movement of the valve sleeve with respect to the primary valve. When the ports 77 and 81 are closed by the piston portions 95 and 97 of the primary valve 43, the fluid pressure supplied to the space below the servo piston is cut off and its upward movement is stopped. When the ports 77 and 81 are closed the downward force on the upper end of the valve sleeve, due to the residual pressure in the upper cavity, is opposed by the fluid pressure in the lower cavity 103 and the lower spring 89 tending to move the sleeve upward. The rate of upward movement of the sleeve, due to the force exerted by the spring 89, depends upon the time required for the fluid pressure at the end of the sleeve to be equalized through the common connecting passage 109 and connecting passages 105 and 107, the areas of which are regulatable by the needle valves 111 and 113.

It is therefore apparent that the rate of downward and upward follow-up movement of the sleeve may be regulated by adjusting both of the needle valves and the rate of upward movement of the servo piston may be regulated by adjusting the upper needle valve 111 and the rate of downward movement thereof may be regulated by adjusting the lower needle valve 113. The extent of upward movement of the servo piston tending to decrease the external load depends upon the time the ports 77 and 81 are open by the primary valve moving downward upon a decrease in engine speed to a lower relative position than the sleeve, and, conversely, the extent of downward movement of the servo piston tending to increase the external load depends upon the time these ports are opened by the primary valve moving upward upon a decrease in engine speed to a higher relative position than the sleeve. The movement of the servo piston ceases whenever the ports 77 and 81 are closed by the valve and sleeve assuming the same relative position as shown in Figure 3 or when they are in the same relative position above or below this position. It is evident that these ports remain closed when the valve and sleeve are moving at the same rate in the same direction with the piston portions 95 and 97 of the valve covering the respective ports 77 and 81 in the valve sleeve. By changing the adjustments of the needle valves the servo piston may be moved to its new position at different rates in one or a plurality of steps, advancing in the same direction, or may be caused to move at a fast rate toward and overshoot this position and then move in the opposite direction to this position, stopping there, or it may continue by and be reversed again and finally stop there. Any variation in the rate and extent of movement in either direction of the piston in reaching the proper position may be obtained by adjusting both of the needle valves or adjusting one with respect to the other. These adjustments make it possible to match the response of the generator with that of the engine and to vary the response of one with respect to the other to get a different over-all characteristic suitable for different traction motor characteristics resulting from the variation in resistance to movement of the vehicle so that the external load on the engine is balanced to its available output by the time the governor weights reach their original position. The engine therefore will always operate at substantially constant speed and constant output.

The speed, load and output of the power generating plant may be regulated by the control lever 13. Clockwise movement of the lever 13 causes an increase in the speed, load and output by increasing the load on the governor spring which causes the fuel and therefore the torque and speed of the engine to increase by a downward movement of the rod 15 connected to the right end of the floating lever 39. The left end of the floating lever 39 is moved upward by the link 41 attached to the control lever 13. This linkage arrangement is such that the primary valve 43, which is connected to the floating lever at a point substantially intermediate its ends, is moved with respect to the sleeve 75 to cause fluid pressure to move the servo piston 49 so that the generator excitation and therefore the output and external load are adjusted to balance the increased output of the prime mover at the speed and torque developed depending upon the position to which the control lever was moved. When the external load balances the engine output at the new torque and speed the sleeve 75 will have moved in follow-up relation to the primary valve 43 to close off the supply of fluid pressure to the servo piston 49 and stop its movement in a new position, the rod 15 will have moved back to its original position and the primary valve 43 and sleeve 75 will be returned to their original position. With this linkage arrangement the pilot valve 43 and sleeve 75 will be returned to a given position for all values of operating speed of the power generating system. The sleeve 75 occupies its central position with respect to the bore and the pilot valve closes the ports 77 and 79 in the sleeve when these ports are in this given position as shown in Figure 3. To obtain lower values of speed, torque, load and output of the power generating system, the control lever is moved counterclockwise to a new position. The control lever 13 may therefore be moved to a maximum output and speed position or a minimum output and speed position or any position therebetween and the generator output and external load will be automatically adjusted by the combined movements of the control lever 13 and rod 15 actuated by the governor to balance the engine output at the speed selected.

I claim:

1. In a power generating system comprising a prime mover, a generator driven thereby, an external load electrically connected to the generator, means for regulating the speed of the prime mover, means for regulating the generator output to control the external load thereon, power operated means for actuating the generator output regulating means, control means for said power operated means, said control means comprising a primary member and a secondary member capable of movement with respect to one another to jointly control the application of power to said power operated means, said secondary member being movable in follow-up relation with respect to the primary member in response to movement of the power operated means, and means movable in response to changes in prime mover speed, due to changes in external load, operatively connected to the means for regulating the speed of the prime mover and to said primary member to restore a balance between the external load and the available prime mover output upon a change in speed so that the power generating system will operate at substantially constant speed and output.

2. In a power generating system comprising a prime mover, a generator driven thereby, an external load electrically connected to the generator, means responsive to the speed of the prime mover for controlling the amount of motive fluid supplied to the prime mover to maintain constant speed, means for regulating the generator output to control the external load thereon, power operated means for actuating the generator output regulating means, control means for the power operated means comprising a primary and secondary member, said primary member being operatively connected to said speed responsive means and movable thereby with respect to the secondary member to control the application of power to the power operated means, said secondary member movable in follow-up relation with respect to the primary member in response to movement of the actuating means to limit the movement of the power operated means, and means associated with the power operated means and secondary member to control the rate of movement of both so that the generator output will be regulated at a rate suitable to match the prime mover response due to changes in the amount of motive fluid supplied thereto upon a change in speed, due to a change in external load, to properly restore a balance between the external load and the available power output of the power generating system.

3. In a power generating system comprising a prime mover, a generator driven thereby, an external load connected to the generator, a governor driven by the prime mover controlling the amount of motive fluid supplied to the prime mover to maintain constant speed thereof, governor setting means for varying the response of the governor to cause the engine to operate at any one of a plurality of limited speed ranges, means for regulating the generator output to control the external load thereon, pressure operated means for actuating the generator output regulating means, control means for the pressure operated means, said control means comprising a primary member and a secondary member, said primary member connected to said governor and to said governor setting means to control the application of pressure to the actuating means, said secondary member movable in follow-up relation with respect to the primary member to limit the movement of the power operated means to thereby regulate the generator output to balance the available prime mover output in the speed range selected.

4. In a power generating system comprising a prime mover, a generator driven thereby, an external load electrically connected to the generator, means for regulating the supply of motive fluid to maintain constant speed of the prime mover, means for regulating the generator output to control the external load thereon, a fluid pressure actuating means for the generator output regulating means, control means for the actuating means comprising a primary valve and a secondary valve capable of movement with respect to one another to allow fluid pressure to enter and leave said actuating means, said secondary member being movable by fluid pressure in follow-up relation to said primary valve in response to movement of the actuating means, and means movable in response to changes in prime mover speed, due to changes in external load, operatively connected to the motive fluid regulator and to the primary valve to restore a balance between the external load and the available prime mover output upon a change in speed so that the power generating system will operate at substantially constant speed and output.

5. In a power generating system comprising a prime mover, a generator driven thereby, an external load electrically connected to the generator, means for regulating the supply of motive fluid to the prime mover to control its speed, means for regulating the generator output to control the external load thereon, fluid pressure actuating means for the generator output regulating means, control means for the actuating means comprising a primary valve and a secondary valve movable with respect to one another to allow fluid pressure to enter and leave the actuating means, said secondary member being movable by fluid pressure discharged from said actuating means in follow-up relation to said primary valve to limit movement of said actuating means, and means movable in response to changes in prime mover speed, due to changes in external load, operatively connected to the motive fluid regulator and to the primary valve to restore a balance between the external load and the available prime mover output upon a change in speed so that the power generating system will operate at constant speed and output.

6. In a power generating system comprising a prime mover, a generator driven thereby, an external load electrically connected to the generator, means for regulating the motive fluid supplied to the prime mover to control its speed, means for regulating the generator output to control the external load thereon, fluid pressure actuating means for the generator output regulating means, control means for the actuating means comprising a primary valve and a secondary valve movable with respect to one another to allow the fluid pressure to enter and be discharged from the actuating means, said secondary member being movable in follow-up relation to said primary valve to limit the movement of the actuating means by the fluid pressure discharged from the actuating means, means to restrict the flow of fluid discharged to control the rate of movement of the actuating means and secondary valve, and means movable in response to changes in prime mover speed, due to changes in external load, operatively connected to said primary valve and to said motive fluid regulator to restore a balance between the external load and the available power output in a predetermined time so that the power generating system will operate at substantially constant speed and output.

7. In a power generating system comprising a prime mover, a generator driven thereby, an external load electrically connected to the generator, means for regulating the supply of motive fluid to the prime mover to control its speed, means for regulating the generator output to control the external load thereon, fluid pressure actuating means for the generator output regulating means, control means for the actuating means comprising a primary valve and a secondary valve movable with respect to one another to allow fluid pressure to enter the actuating means and allow fluid to be discharged therefrom, said secondary valve movable in follow-up relation with respect to the primary valve by the pressure of the discharged fluid, spring means associated with the secondary valve acting to oppose such movement, adjustable orifice means to control the pressure of the fluid discharged whereby the rate, direction and extent of movement of the actuating means and secondary valve may be varied with respect to the primary valve movement and a governor driven by the prime mover operatively connected to said primary valve and said motive fluid regulator movable upon a change in speed resulting from a change in external load to restore a balance between the external load and the available prime mover output by the time the governor has completed its regulating movement away from and back to its original speed position.

8. In a power generating system comprising a prime mover, a generator driven thereby, an external load electrically connected to the generator, means for regulating the generator output to control the external load thereon, fluid pressure actuating means for the generator output regulating means, control means for the actuating means comprising a primary valve and a secondary valve to jointly control the actuating means, a governor driven by the prime mover for regulating the amount of fuel supplied to the prime mover to regulate the speed and torque thereof, means for setting the governor to cause operation of the prime mover at any one of a plurality of preselected speeds and connecting means between said primary control valve and both said governor and said governor setting means to move said primary valve with respect to said secondary valve to allow fluid pressure to enter and leave said actuating means to cause movement thereof, said secondary valve being movable in follow-up relation with respect to said primary valve by fluid pressure developed by resistance to outward flow from said actuating means to cut off the pressure supply to said actuating means and stop movement thereof when the external load on the prime mover balances the available torque of the prime mover at the speed selected, said connecting means arranged to return said primary valve to a given position for any speed selected when the prime mover output balances the external load at the speed selected.

9. In a power generating system comprising a prime mover, a generator driven thereby, an external load electrically connected to the generator, a governor driven by the prime mover for regulating the amount of motive fluid supplied to the prime mover to control the speed and torque thereof, means for setting the governor to cause the prime mover to operate at any one of a plurality of preselected values of speed, means for regulating the generator output to control the external load thereon, fluid pressure actuating means for the generator regulating means, control means for the actuating means comprising a primary valve and a secondary valve to jointly control the actuating means, connecting means between said primary valve and both said governor and said governor setting means to move said primary valve with respect to said secondary valve to allow fluid pressure to enter and leave said actuating means to cause movement thereof, said connecting means arranged to return said primary valve to a given position upon a balance being reached between the available torque output of the prime mover and the external load thereon at the speed selected, said secondary valve being movable in follow-up relation to the primary valve by fluid pressure leaving said actuating means to cut off fluid pressure thereto to stop movement thereof when the external load balances the available torque, and spring means acting on said secondary valve tending to return it to its original position when said fluid pressure acting thereon falls to a low value.

RICHARD M. DILWORTH.